US012749460B2

(12) United States Patent
Xie et al.

(10) Patent No.: US 12,749,460 B2
(45) Date of Patent: Sep. 29, 2026

(54) DRIVING CIRCUIT, DISPLAY DEVICE AND DRIVING METHOD

(71) Applicants: CHONGQING BOE SMART ELECTRONICS SYSTEM CO., LTD., Chongqing (CN); BOE TECHNOLOGY GROUP CO., LTD., Beijing (CN)

(72) Inventors: Yunyan Xie, Beijing (CN); Lichun Chen, Beijing (CN); Xinbo Yu, Beijing (CN); Nanting Chen, Beijing (CN); Qiangeng Cheng, Beijing (CN); Junsheng Chen, Beijing (CN)

(73) Assignees: CHONGQING BOE SMART ELECTRONICS SYSTEM CO., LTD., Chonqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 19/208,675

(22) Filed: May 15, 2025

(65) Prior Publication Data

US 2025/0342808 A1 Nov. 6, 2025

Related U.S. Application Data

(63) Continuation of application No. 18/262,020, filed as application No. PCT/CN2022/106860 on Jul. 20, 2022, now Pat. No. 12,340,770.

(51) Int. Cl.
*G09G 3/34* (2006.01)
*G06K 19/07* (2006.01)

(52) U.S. Cl.
CPC ......... *G09G 3/344* (2013.01); *G06K 19/0708* (2013.01); *G06K 19/0723* (2013.01); *G09G 2330/02* (2013.01); *G09G 2370/00* (2013.01)

(58) Field of Classification Search
CPC ................................ G09G 3/344; G06F 3/147
See application file for complete search history.

(56) References Cited

U.S. PATENT DOCUMENTS

2013/0043979 A1* 2/2013 Huang .................... G06F 3/147
340/10.1
2022/0319444 A1* 10/2022 Hu ......................... G09G 3/344

FOREIGN PATENT DOCUMENTS

CN 106953662 A 7/2017

OTHER PUBLICATIONS

Office Action dated May 22, 2026, issued in counterpart CN Application No. 202280002266.2, with English translation. (35 pages).

* cited by examiner

*Primary Examiner* — Kevin M Nguyen
(74) *Attorney, Agent, or Firm* — WHDA, LLP

(57) ABSTRACT

A driving circuit, a display device and a driving method relate to the field of display technology. The driving circuit includes: an induction coil, a power supply control module, a storage capacitor and a display control module; wherein the induction coil is configured for receiving a first radio frequency signal or a second radio frequency signal to supply power to the driving circuit; the power supply control module is respectively connected to the storage capacitor and the display control module, and is configured for collecting second electric energy generated by the induction coil, storing the second electric energy into the storage capacitor, and controlling the storage capacitor to conduct with the display control module; and the display control module is further connected to a display unit, and is configured for controlling the display unit to display according to the display data.

19 Claims, 6 Drawing Sheets

DRIVING CIRCUIT, DISPLAY DEVICE AND DRIVING METHOD

CROSS REFERENCE TO THE RELATED APPLICATIONS

The present application is a Continuous application (CA) of U.S. application Ser. No. 18/262,020, which is the national phase entry of International Application No. PCT/CN2022/106860, filed on Jul. 20, 2022, which is incorporated herein in its entirety by reference.

TECHNICAL FIELD

The present disclosure relates to the technical field of displaying and, more particularly, to a driving circuit, a display device and a driving method.

BACKGROUND

Electronic paper display technology mainly utilizes the principle of electrophoresis display (EPD) to drive dyed particles with different electric properties to move by electric field, and finally presents particle color at the display side. After power interruption, the dyed particles still remain in place and show a "steady state". Therefore, the electronic paper display device has an effect of protecting eyes and saving electricity.

SUMMARY

The present disclosure provides a driving circuit, including: a power supply control module, a storage capacitor and a display control module;

wherein the induction coil is configured for receiving a first radio frequency signal or a second radio frequency signal to supply power to the driving circuit; the first radio frequency signal includes permission information configured for instructing the driving circuit to obtain permission or to disable the permission; and the second radio frequency signal includes display data;

the power supply control module is respectively connected to the storage capacitor and the display control module, and is configured for collecting second electric energy generated by the induction coil receiving the second radio frequency signal, storing the second electric energy into the storage capacitor, and controlling the storage capacitor to conduct with the display control module when a storage voltage of the storage capacitor meets a power supply condition; and the display control module is further connected to a display unit, and is configured for controlling the display unit to display according to the display data driven by the storage voltage.

In an optional implementation, the display control module includes a second transistor, a current limiting resistor, a boost circuit and a driving chip;

wherein a control electrode of the second transistor is connected to the driving chip, a first electrode of the second transistor is connected to the boost circuit, and a second electrode of the second transistor is respectively connected to a first end of the current limiting resistor and the driving chip; the boost circuit is further connected to the power supply control module, a first interface of the driving chip and a second interface of the driving chip, and is configured for performing voltage writing on the first interface and the second interface according to an output of the first electrode of the second transistor driven by the storage voltage; a second end of the current limiting resistor is connected to ground; and the driving chip is further connected to the display unit, and is configured for providing a pulse signal to the display unit according to the display data, a voltage of the first interface and a voltage of the second interface.

In an optional implementation, the driving circuit further includes a first switch module, a first control circuit and a second control circuit;

wherein the first switch module is respectively connected to the induction coil, the first control circuit and the second control circuit, and is configured for conducting the induction coil and the first control circuit in a first state or conducting the induction coil and the second control circuit in a second state;

the first control circuit is configured for performing data transmission with a first terminal in the first state; and the first terminal is a terminal for transmitting the first radio frequency signal; and the second control circuit is further connected to the display unit, and is configured for receiving display data sent by a second terminal in the second state, and controlling the display unit to display according to the display data; and the second terminal is a terminal for transmitting the second radio frequency signal.

In an optional implementation, the first switch module includes at least one of: a magnetic reed switch, a tact switch and a toggle switch.

In an optional implementation, the second control circuit includes: the power supply control module, the storage capacitor and the display control module;

wherein the power supply control module is respectively connected to the first switch module, the storage capacitor and the display control module, and is configured for collecting the second electric energy generated by the induction coil receiving the second radio frequency signal, storing the second electric energy into the storage capacitor, and controlling the storage capacitor to conduct with the display control module when a storage voltage of the storage capacitor meets a power supply condition.

In an optional implementation, the power supply control module includes a processing unit, a voltage comparator and a second switch module;

wherein the processing unit is respectively connected to the first switch module, the storage capacitor, the voltage comparator and the second switch module, and is configured for collecting the second electric energy, storing the second electric energy into the storage capacitor; generating a control signal of the second switch module according to a comparison result output by the voltage comparator;

the voltage comparator is further connected to the storage capacitor and a reference voltage input end, and is configured for comparing the storage voltage with a reference voltage input by the reference voltage input end and outputting a comparison result to the processing unit; and the second switch module is further connected to the storage capacitor and the display control module, and is configured for controlling the conduction/shutoff between the storage capacitor and the display control module according to the control signal.

In an optional implementation, the second switch module includes:

a first transistor, a control electrode of the first transistor being connected to the processing unit, a first electrode of the first transistor being connected to the storage capacitor and a second electrode of the first transistor being connected to the display control module.

In an optional implementation, the first control circuit includes a passive electronic tag.

The present disclosure provides a display device, including the driving circuit according to any one of embodiments stated above and the display unit.

In an optional implementation, the display unit includes an electronic paper.

The present disclosure provides a driving method applied to the driving circuit according to a part of the embodiments stated above, the driving method including:

in the first state, the induction coil receiving the first radio frequency signal, and the first control circuit performing the data transmission with the first terminal; and in the second state, the induction coil receiving the second radio frequency signal, the second control circuit receiving the display data sent by the second terminal, and controlling the display unit to display according to the display data.

In an optional implementation, the step of performing data transmission with the first terminal includes:

sending first identity information to the first terminal, and receiving the permission information fed back by the first terminal; wherein the permission information is generated by the first terminal according to the first identity information, and is configured for instructing the driving circuit to obtain the permission or to disable the permission.

In an optional implementation, the step of receiving display data sent by the second terminal includes:

sending second identity information to the second terminal, so that the second terminal determines whether to send a data writing request according to the second identity information; and receiving the display data in response to the data writing request.

In an optional implementation, the step of controlling the display unit to display according to the display data includes:

controlling the display unit to display according to the display data, when reception of the display data is completed;

after the step of receiving the display data sent by the second terminal, before the step of controlling the display unit to display according to the display data, further including:

when the reception of the display data is interrupted, and a number of times of reception is less than the preset number of times, re-performing the step of receiving the display data sent by the second terminal;

when the reception of the display data is interrupted, and the number of times of reception is greater than or equal to the preset number of times, feeding back information about data transmission failure.

In an optional implementation, when the second control circuit includes the power supply control module, the storage capacitor and the display control module, before the step of controlling the display unit to display according to the display data, further including:

in the second state, the power supply control module collecting the second electric energy generated by the induction coil receiving the second radio frequency signal, and storing the second electric energy into the storage capacitor;

at a first moment, controlling conduction between the storage capacitor and the display control module, so that the display control module controls the display unit to display according to the display data driven by the storage voltage; wherein the first moment is a moment delayed by a preset duration relative to a second moment, the preset duration is greater than or equal to zero seconds, the second moment is a moment when the storage voltage of the storage capacitor is greater than or equal to a reference voltage, and the reference voltage is greater than or equal to an operating voltage of the display control module.

In an optional implementation, the display unit includes a plurality of pixel units, the pixel units include pixel electrodes and at least two differently colored dyed particles, the pixel electrodes are configured for providing an electric field for moving the dyed particles; and the step of controlling the display unit to display according to the display data includes:

in an equilibration stage, providing a first pulse signal to the pixel electrodes to make the dyed particles stationary;

in a shaking up stage, providing a second pulse signal to the pixel electrodes to disperse the dyed particles of different colors from each other;

in a display stage, according to the display data, providing a third pulse signal to the pixel electrodes to move the dyed particles under the action of the electric field for picture display;

wherein a sum of durations of the equilibration stage, the shaking up stage and the display stage is less than or equal to fifteen seconds.

The above description is only a summary of technical schemes of the present disclosure, which can be implemented according to contents of the specification in order to better understand technical means of the present disclosure; and in order to make above and other objects, features and advantages of the present disclosure more obvious and understandable, detailed description of the present disclosure is particularly provided in the following.

BRIEF DESCRIPTION OF THE DRAWINGS

In order to more clearly illustrate the technical solutions of the embodiments of the present disclosure or the prior art, the figures that are required to describe the embodiments or the prior art may be briefly introduced below. Apparently, the figures that are described below are embodiments of the present disclosure, and a person skilled in the art can obtain other figures according to these figures without paying creative work. It should be noted that the proportions in the drawings are only indicative and do not represent actual proportions.

DETAILED DESCRIPTION OF THE EMBODIMENTS

In order to make the objects, the technical solutions and the advantages of the embodiments of the present disclosure clearer, the technical solutions of the embodiments of the present disclosure may be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

An electronic badge mainly includes an active badge and a passive badge. Wherein an active badge is generally powered by a battery, however, the battery is not environmentally friendly, and the appearance and weight of such badge are limited due to the large size of the battery itself. While a passive badge utilizes radio frequency induction such as near field communication (NFC) to convert magnetic energy into electric energy and replace traditional battery power supply. Therefore, a passive badge has the characteristics of green, environmental protection and low power consumption, and has been widely studied and applied.

Figure 1:
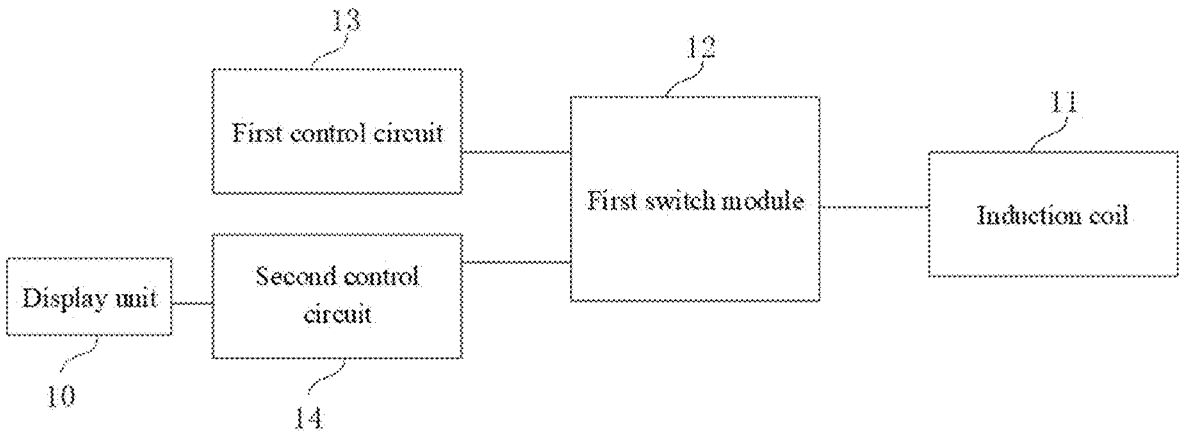
FIG. 1 schematically shows a schematic structural diagram of a driving circuit according to the present disclosure.

The present disclosure provides a driving circuit, referring to FIG. 1 which schematically shows a schematic structural diagram of a driving circuit according to the present disclosure. As shown in FIG. 1, the driving circuit includes: an induction coil 11, a first switch module 12, a first control circuit 13 and a second control circuit 14.

Wherein the induction coil 11 is configured for receiving a first radio frequency signal or a second radio frequency signal to supply power to the driving circuit.

The first switch module 12 is respectively connected to the induction coil 11, the first control circuit 13 and the second control circuit 14, and is configured for conducting the induction coil 11 and the first control circuit 13 in a first state or conducting the induction coil 11 and the second control circuit 14 in a second state.

The first control circuit 13 is configured for performing data transmission with a first terminal in the first state; the first terminal is a terminal for transmitting the first radio frequency signal.

The second control circuit 14 is also connected to the display unit 10, and is configured for receiving display data sent by the second terminal in the second state, and controlling the display unit 10 to display according to the display data; the second terminal is a terminal for transmitting the second radio frequency signal.

According to the driving circuit provided by the present disclosure, by disposing a first control circuit 13 and a second control circuit 14, the two different control circuits may be respectively configured for achieving two functions of card swiping and display driving, for example, the first control circuit 13 is configured for achieving the function of card swiping, and the second control circuit 14 is configured for achieving the function of driving a display screen for display, so that the reliability and applicability of the two functions may be improved. With the driving circuit according to the present disclosure, cards may be designed that are compatible with personalized refresh display functions as well as card swiping functions.

In addition, the first control circuit 13 and the second control circuit 14 share the same induction coil 11, and the first switch module 12 controls the conduction between the induction coil 11 and the first control circuit 13, or the conduction between the induction coil 11 and the second control circuit 14, so that the switching between the card swiping function and the display driving function may be achieved, and thus the problem of signal interference caused by the two control circuits respectively disposing the induction coil 11 may be avoided.

Illustratively, the first control circuit 13 may include a passive electronic tag. The second control circuit 14 may include a CPU or a MCU.

Wherein the passive electronic tag, namely passive tag, has strong anti-interference ability. When the passive electronic tag is far away from the first terminal, the electronic tag is in a passive state and cannot send or receive data; when the passive electronic tag is relatively close to the first terminal, the electronic tag acquires electric energy via the induction coil 11 and performs data transmission with the first terminal. Compared with the scheme using CPU or MCU to simulate the card swiping function, disposing a passive electronic tag alone may make the card more sensitive and adaptable to a wider range of card reader field strength, which can meet the card reading function of 99% card readers on the market and has stronger adaptability.

In the first state, the induction coil 11 receives a first radio frequency signal transmitted by a first terminal (such as a card reader with an NFC function, including a door access control, a card swiping machine, etc.), and due to electromagnetic induction, the induction coil may convert magnetic energy in the first radio frequency signal into first electric energy, and the first electric energy is configured for driving the first control circuit 13, thereby achieving power supply to the first control circuit 13.

Driven by the first electric energy, data transmission may be performed between the first control circuit 13 and the first terminal. Illustratively, when the first control circuit 13 and the first terminal complete protocol (such as an NFC protocol) instruction matching, the first control circuit 13 may send first identity information to the first terminal; the first terminal matches the first identity information with data stored in the first terminal, and generates permission information according to the matching result and sends the same to the first control circuit 13; the first control circuit 13 receives the permission information fed back by the first terminal. Wherein the permission information is configured for instructing the driving circuit to obtain the permission or to disable the permission to achieve the card swiping function.

In the second state, the induction coil 11 receives a second radio frequency signal transmitted by a second terminal (such as a mobile phone with an NFC function or a card reader/writer, etc.), and due to electromagnetic induction, the induction coil may convert magnetic energy in the second radio frequency signal into second electric energy, and the second electric energy is configured for driving the second control circuit 14, thereby achieving power supply to the second control circuit 14.

Driven by the second electric energy, the second control circuit 14 may receive the display data sent by the second terminal. Illustratively, when the second control circuit 14 and the second terminal complete protocol (such as an NFC protocol) instruction matching, the second control circuit 14 may send second identity information to the second terminal; the second terminal determines whether there is a data writing requirement according to the second identity information, and if so, sends a data writing request to the second control circuit 14; the second control circuit 14 receives display data in response to the data writing request, and controls the display unit 10 to display according to the display data.

Illustratively, the first state may be set to a default state. Namely, in a default state, the first switch module 12 conducts the induction coil 11 and the first control circuit 13 to achieve a card swiping function. When it is necessary to update the display picture on the display unit, the first switch module 12 is switched from the first state to the second state, so that the first switch module 12 conducts the induction coil 11 and the second control circuit 14 to achieve the refresh display function.

In some embodiments, the first switch module 12 includes a passive switch. Further, the first switch module 12 may include at least one of: a magnetic reed switch, a tact switch and a toggle switch.

In a first embodiment, the conduction between the induction coil 11 and the first control circuit 13 or the second control circuit 14 may be controlled in a magnetic attraction manner. In this embodiment, the first switch module 12 includes a magnetic reed switch. The magnetic reed switch may be switched from a default first state to a second state under the action of an external magnetic field.

For example, a magnet may be disposed on the second terminal to generate a magnetic field that changes the state of the magnetic reed switch. In this case, only the designated second terminal (e.g. a designated card reader/writer) may be used to transmit the display data to the second control circuit 14, thereby achieving the picture update of the display unit 10.

In the default state, the magnetic reed switch conducts the induction coil 11 and the first control circuit 13, and when it is necessary to switch to the second state, automatic switching may be achieved close to the designated second terminal (e.g. a second terminal provided with a magnet) without manual operation.

As the thickness of the magnetic reed switch is large, typically around 2.5 centimeters, the thickness of the corresponding driving circuit and the card to which the driving circuit is applied may also be relatively large, possibly up to 5.5 centimeters.

In a second embodiment, the conduction between the induction coil 11 and the first control circuit 13 or the second control circuit 14 may be controlled in a pressing manner. In this embodiment, the first switch module 12 includes a tact switch. The tact switch may be switched from a default first state to a second state under the action of an external force pressing.

In the default state, the tact switch conducts the induction coil 11 and the first control circuit 13, and when it is necessary to switch from the default first state to the second state, it may be achieved by pressing the tact switch, and the first state is restored after the pressing is released.

As the tact switch is high, in order to avoid false touches, a matched housing may be designed to protect it. Compared with the solution using a magnetic reed switch, the use of a tact switch may reduce costs, is easier to implement and has a wider range of applications since there is no need to dispose a magnet on the second terminal, and may avoid the problem of switch failure due to unstable performance of the magnetic reed switch.

In a third embodiment, the conduction between the induction coil 11 and the first control circuit 13 or the second control circuit 14 may be controlled in a toggle manner. In this embodiment, the first switch module 12 includes a toggle switch. The toggle switch may be switched from a default first state to a second state under the action of an external force toggle.

In the default state, the toggle switch conducts the induction coil 11 and the first control circuit 13, and when it is necessary to switch to the second state, it may be achieved by toggling the switch lever.

Figure 5:
FIG. 5 schematically shows a schematic structural diagram of a toggle switch disposed on a card.

In particular implementations, the toggle switch may be, for example, a side toggle switch (as shown in FIG. 5). Compared with the solution using a magnetic reed switch, the use of a toggle switch may reduce costs, is easier to implement and has a wider range of applications since there is no need to dispose a magnet on the second terminal, and may avoid the problem of switch failure due to unstable performance of the magnetic reed switch, and may reduce the thickness of the driving circuit and the card to which the driving circuit is applied. Compared with the solution using a tact switch, the operation is more convenient.

As shown in FIG. 5, a toggle switch is disposed on the rear housing of the card, and toggling the switch lever to the left image state may achieve the card swiping function, and toggling to the right image state may achieve the display picture refreshing function.

It should be noted that FIG. 5 is illustrated by taking a side toggle switch as an example. In particular implementations, the first switch module 12 may also include a push-button switch, and the switching between a card swiping function and a display picture refreshing function is achieved by pressing a key or restoring a key; may also include a rotary button switch, and the switching between a card swiping function and a display picture refreshing function is achieved by rotating a button or restoring a button; and may also include other switches capable of achieving the conduction switching function between the induction coil 11 and the first control circuit 13 or the second control circuit 14, which may be specifically determined according to actual requirements and the structure of the driving circuit, and the present disclosure is not limited thereto.

It should be noted that the second state may also be set to a default state, and the present disclosure is not limited thereto.

Figure 2:
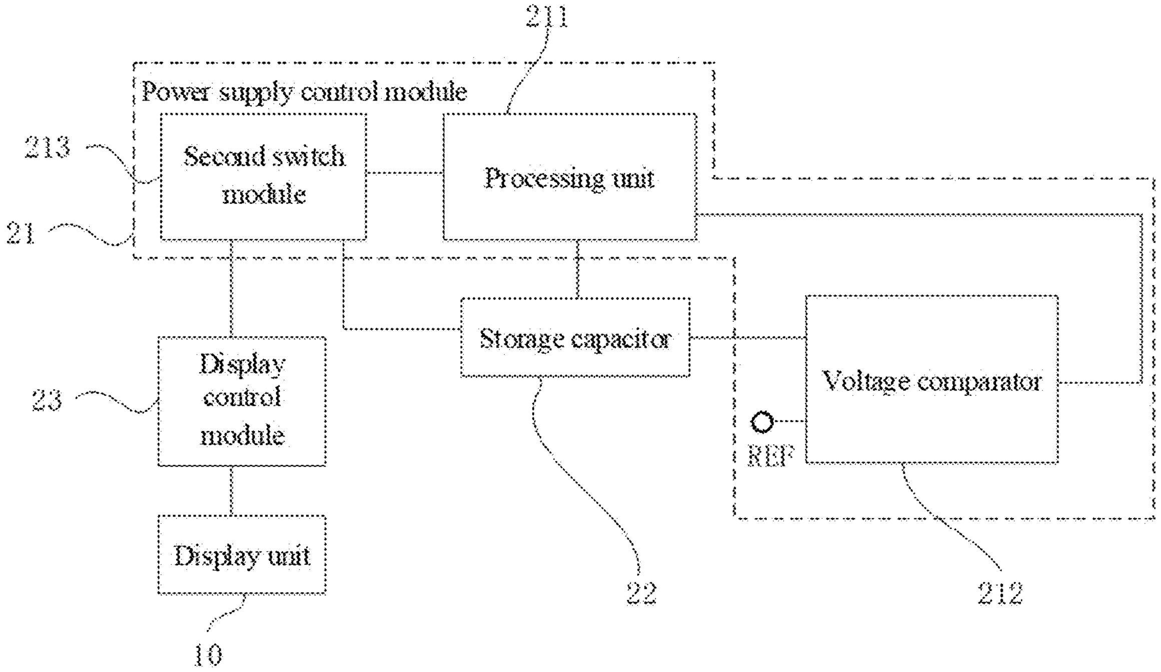
FIG. 2 schematically shows a schematic structural diagram of a second control circuit according to the present disclosure.

Referring to FIG. 2, it schematically shows a schematic structural diagram of a second control circuit according to the present disclosure. As shown in FIG. 2, the second control circuit 14 includes: a power supply control module 21, a storage capacitor 22 and a display control module 23.

Wherein the power supply control module 21 is respectively connected to the first switch module 12 (not shown in FIG. 2), the storage capacitor 22 and the display control module 23, and is configured for collecting the second electric energy generated by the induction coil 11 (not shown in FIG. 2) receiving the second radio frequency signal, storing the second electric energy into the storage capacitor 22, and controlling the storage capacitor 22 to conduct with the display control module 23 when the storage voltage of the storage capacitor 22 meets the power supply condition.

The display control module 23 is also connected to the display unit 10, and is configured for controlling the display unit 10 to display according to the display data driven by the storage voltage.

Illustratively, the moment when the storage voltage of the storage capacitor 22 is greater than or equal to the reference voltage is a second moment, and the moment delayed by a preset duration with respect to the second moment may be considered to be the moment when the storage voltage meets the power supply condition. Wherein the preset duration may be greater than or equal to zero seconds, and the reference voltage is greater than or equal to the operating voltage of the display control module. The preset duration may be, for example, 20μ s.

Illustratively, as shown in FIG. 2, the power supply control module 21 includes a processing unit 211, a voltage comparator 212 and a second switch module 213.

Wherein the processing unit 211 is respectively connected to the first switch module 12 (not shown in FIG. 2), the storage capacitor 22, the voltage comparator 212 and the second switch module 213, and is configured for collecting second electric energy, storing the second electric energy into the storage capacitor 22; generating the control signal of the second switch module 213 according to the comparison result output by the voltage comparator 212.

The voltage comparator 212 is also connected to the storage capacitor 22 and the reference voltage input end REF, and is configured for comparing the storage voltage with the reference voltage input by the reference voltage input end (REF) and outputting the comparison result to the processing unit 211.

The second switch module 213 is also connected to the storage capacitor 22 and the display control module 23, and is configured for controlling the conduction/shutoff between the storage capacitor 22 and the display control module 23 according to a control signal.

Illustratively, the processing unit 211 includes a CPU chip (such as the IC101 shown in FIG. 3) or an MCU chip.

Figure 3:
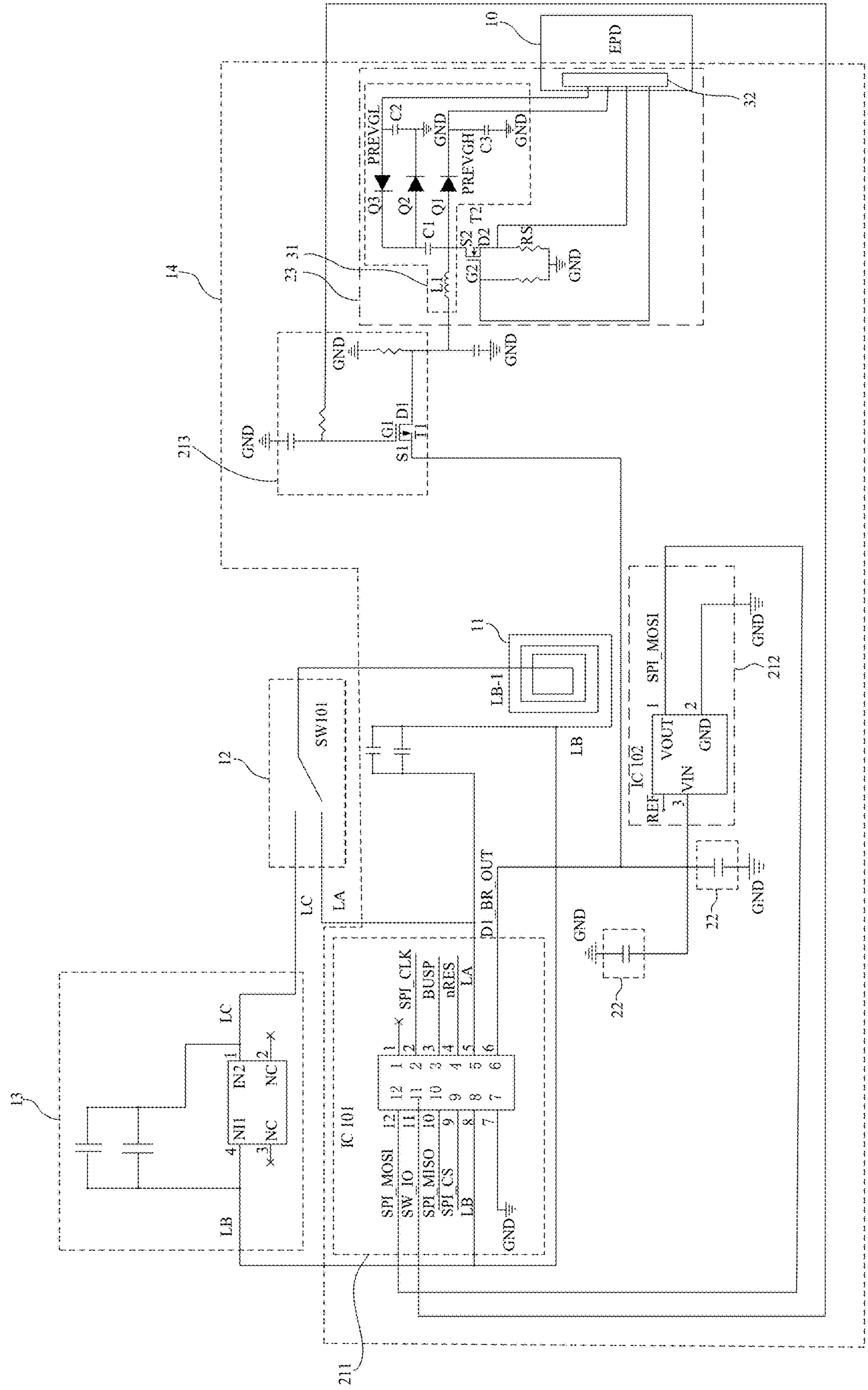
FIG. 3 schematically shows a schematic structural diagram of an example of a driving circuit according to the present disclosure.

Illustratively, as shown in FIG. 3, the second switch module 213 includes that the first transistor T1, the control electrode G1 of the first transistor is connected to the processing unit 211, the first electrode S1 of the first transistor is connected to the storage capacitor 22, and the second electrode D1 of the first transistor is connected to the display control module 23.

Illustratively, as shown in FIG. 3, the display control module 23 includes a second transistor T2, a current limiting resistor RS, a boost circuit 31, and a driving chip 32.

Wherein for the second transistor T2, the control electrode G2 of the second transistor is connected to the driving chip 32, the first electrode S2 of the second transistor is connected to the boost circuit 31, and the second electrode D2 of the second transistor is respectively connected to the first end of the current limiting resistor RS and the driving chip 32.

The boost circuit 31 is also connected to the power supply control module 21 and a first interface (such as PREVGH) of the driving chip 32 and a second interface (such as PREVGL) of the driving chip 32, and is configured for performing voltage writing on the first interface and the second interface according to the output of the first electrode S2 of the second transistor T2 driven by the storage voltage.

A second end of the current limiting resistor RS is connected to ground.

The driving chip 32 is also connected to the display unit 10, and is configured for providing a pulse signal to the display unit 10 according to the display data, the voltage of the first interface and the voltage of the second interface.

The boost circuit 31 may include an inductor L1, a first capacitor C1, a second capacitor C2, a third capacitor C3, a first diode Q1, a second diode Q2 and a third diode Q3, and the connection circuit is as shown in FIG. 3.

Illustratively, the stray capacitance value of the second transistor T2 is less than or equal to one hundred picofarads. For example, the maximum stray capacitance value of the second transistor T2 is less than or equal to ninety picofarads, eighty picofarads, seventy picofarads, sixty picofarads, fifty picofarads, forty picofarads, thirty picofarads, twenty picofarads, or ten picofarads, etc. and the present disclosure is not limited thereto.

By selecting the second transistor T2 with a smaller stray capacitance value, the switching speed of the second transistor T2 may be increased, the switching time may be reduced, and the energy loss caused in the switching process may be reduced, to ensure that the power supply voltage of the driving chip 32 is above the operating voltage (e.g. 2.2 V) during the refresh display, to avoid the picture refreshing failure caused by the insufficient power supply of the driving chip 32, to improve the picture refreshing success rate and to enhance the user experience.

Illustratively, the current limiting resistor RS has a resistance value greater than or equal to one ohm and less than or equal to five ohms. For example, the resistance value of the current limiting resistor RS may be, for example, 1.2 ohms, 1.5 ohms, 1.6 ohms, 1.8 ohms, 2.0 ohms, 2.2 ohms, 2.4 ohms, or 3.0 ohms, etc. and the present disclosure is not limited thereto.

When the current flowing through the current limiting resistor RS decreases, the peak current of the driving chip 32 during the refresh display will also decrease accordingly. By selecting the current limiting resistor RS with a greater resistance value, the peak current of the driving chip 32 during the fresh display may be reduced, the loss caused in the refreshing process may be reduced, and the voltage division of the current limiting resistor RS may be reduced at the same time, to ensure that the power supply voltage of the driving chip 32 is above the operating voltage (e.g. 2.2 V) during the refresh display, to avoid the picture refreshing failure caused by the insufficient power supply of the driving chip 32, to improve the picture refreshing success rate and to enhance the user experience.

In particular implementations, the driving chip 32 may be bound to the display unit 10 and other portions of the display control module 23 may be located on a printed circuit board.

Illustratively, as shown in FIG. 3, one end of the storage capacitor 22 is connected to the processing unit 211, the voltage comparator 212 and the second switch module 213, respectively, and the other end is connected to ground.

Illustratively, the storage capacitor 22 may include at least one of: ceramic capacitors and Farad capacitors. That is, the storage capacitor 22 may include a ceramic capacitor, or a Farad capacitor, or a ceramic capacitor and a Farad capacitor connected in parallel with each other.

Since the thickness of a Farad capacitor is generally three millimeters or more, the use of a Farad capacitor may result in a thicker overall thickness of the product. The use of ceramic capacitors instead of Farad capacitors may reduce the volume and cost of the product, make the product more lightweight, easier to carry, and improve the stability and reliability of capacitor power supply.

In particular implementations, the number of storage capacitors 22 may be one or more in parallel with each other (as shown in FIG. 3), and the present disclosure is not limited thereto.

In particular implementations, the second control circuit 14 may also include a communication module (not shown in the figure) that may be configured for converting and transmitting display data, and is connected to the processing unit 211 via an inter-integrated circuit (I2C) bus.

In particular implementations, the second control circuit 14 may also include a storage (not shown in the figure) that may be configured for storing display data and communicating with the processing unit 211 via a serial peripheral interface (SPI) connection for data transmission.

Figure 4:
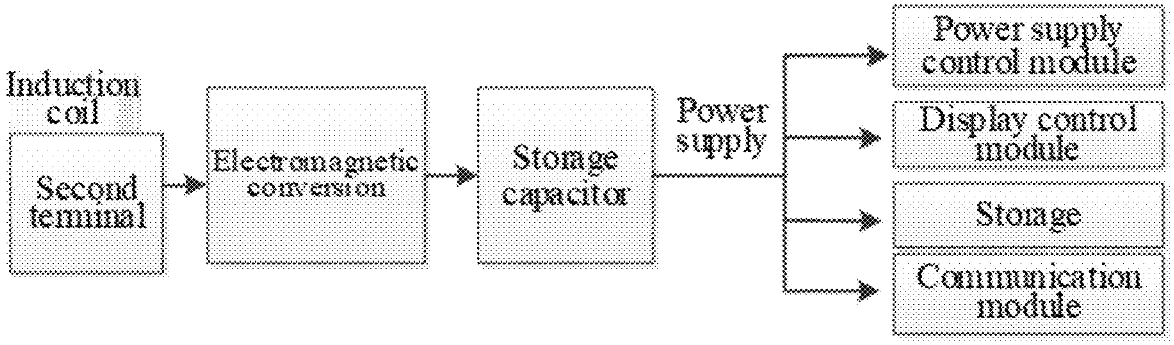
FIG. 4 schematically shows a schematic structural diagram of power supply of a driving circuit according to the present disclosure.

As shown in FIG. 4, the induction coil 11 receives a second radio frequency signal, and may convert the magnetic energy in the second radio frequency signal into electric energy, namely, second electric energy, and the second electric energy may be stored in a storage capacitor 22 to replace a conventional battery and supply power for a power supply control module 21, a display control module 23, a communication module and a storage, etc.

The present disclosure also provides a display device, referring to FIG. 1, including a display unit 10, and a driving circuit as provided in any one of the embodiments connected to the display unit 10.

As may be appreciated by those skilled in the art, the display device has the advantages of the aforementioned driving circuit.

Optionally, the display unit 10 includes an electronic paper. The electronic paper is used to display the picture and achieve the real-time update of display information, which has the advantages of environmental protection, low power consumption and eye protection.

Illustratively, the display unit 10 may include an electronic paper capable of three-color display of black, white and red, so that the display unit 10 may achieve a color display, and a badge capable of achieving a color display.

The display device according to the present disclosure may be any product or component having a display function such as a bedside card, an infusion card, an electronic table card, an electronic book, an electronic display card, an electronic badge, an electronic tag, a bus stop board, etc. and the embodiments of the present disclosure are not limited thereto.

The present disclosure also provides a driving method, which is applied to the driving circuit provided in any of the embodiments, referring to FIGS. 1 to 3, the driving method including:

step S01: in a first state, the induction coil 11 receiving a first radio frequency signal, and the first control circuit 13 performing data transmission with the first terminal;

step S02: in a second state, the induction coil 11 receiving a second radio frequency signal, and the second control circuit 14 receiving display data sent by the second terminal and controlling the display unit 10 to display according to the display data.

Illustratively, the step of performing data transmission with the first terminal in step S01 may include: sending first identity information to a first terminal, and receiving permission information fed back by the first terminal; wherein the permission information is generated by the first terminal according to the first identity information, and is configured for instructing the driving circuit to obtain the permission or to disable the permission.

Figure 6:
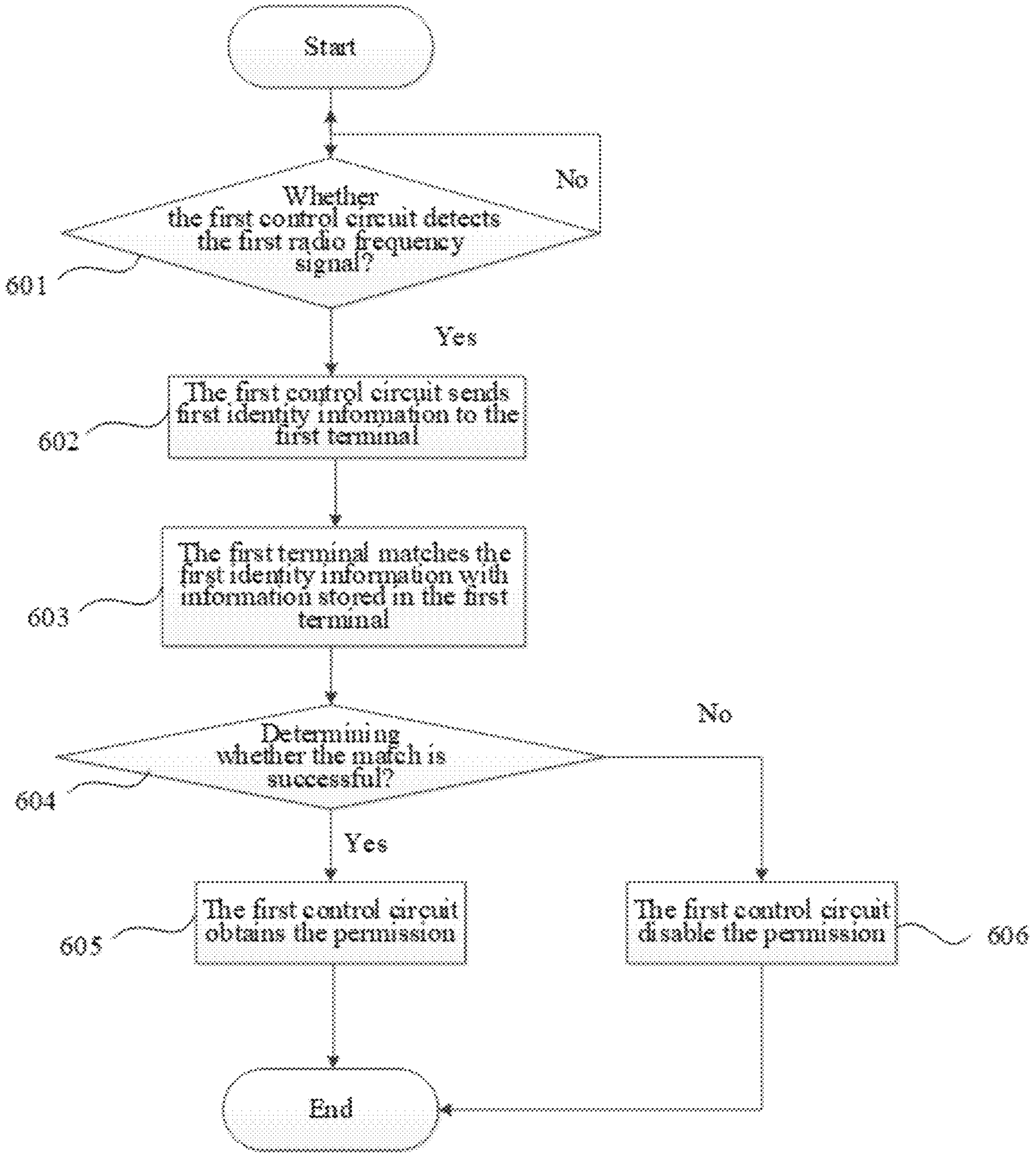
FIG. 6 schematically shows a schematic flow chart of a first control circuit for performing data transmission with a first terminal.

In practical applications, when the first control circuit 13 detects a first radio frequency signal, the first control circuit 13 performs protocol (such as an NFC protocol) instruction matching with the first terminal, and after the protocol instruction matching is completed, data transmission is performed between the first control circuit 13 and the first terminal. Referring to FIG. 6, it schematically shows a schematic flow chart of a first control circuit for performing data transmission with a first terminal, and may specifically include:

step 601: whether the first control circuit detects the first radio frequency signal? If so, performing step 602, and if not, re-performing step 601.

step 602: the first control circuit sends the first identity information to the first terminal.

step 603: the first terminal matches the first identity information with information stored in the first terminal.

step 604: determining whether the match is successful? If so, performing step 605;

and if not, performing step 606.

step 605: the first control circuit obtains the permission.

step 606: the first control circuit disables the permission.

Illustratively, in step S02, the step of receiving the display data sent by the second terminal may include: first sending second identity information to the second terminal, so that the second terminal determines whether to send a data writing request according to the second identity information; and then receiving the display data in response to the data writing request sent by the second terminal.

Illustratively, the step of controlling the display unit 10 to display according to the display data in step S02 may include: controlling the display unit 10 to display according to the display data, if the reception of the display data is completed.

Illustratively, in step S02, after the step of receiving the display data sent by the second terminal, before the step of controlling the display unit 10 to display according to the display data, it may also include: if the reception of the display data is interrupted, and the number of times of reception is less than the preset number of times, the step of receiving the display data sent by the second terminal is re-performed; if the reception of the display data is interrupted, and the number of times of reception is greater than or equal to the preset number of times, the information about a data transmission failure is fed back.

Illustratively, in step S02, after the step of controlling the display unit 10 to display according to the display data, it may also include: if the refresh display of the display unit 10 is interrupted, the information about the refresh failure is fed back.

Figure 7:
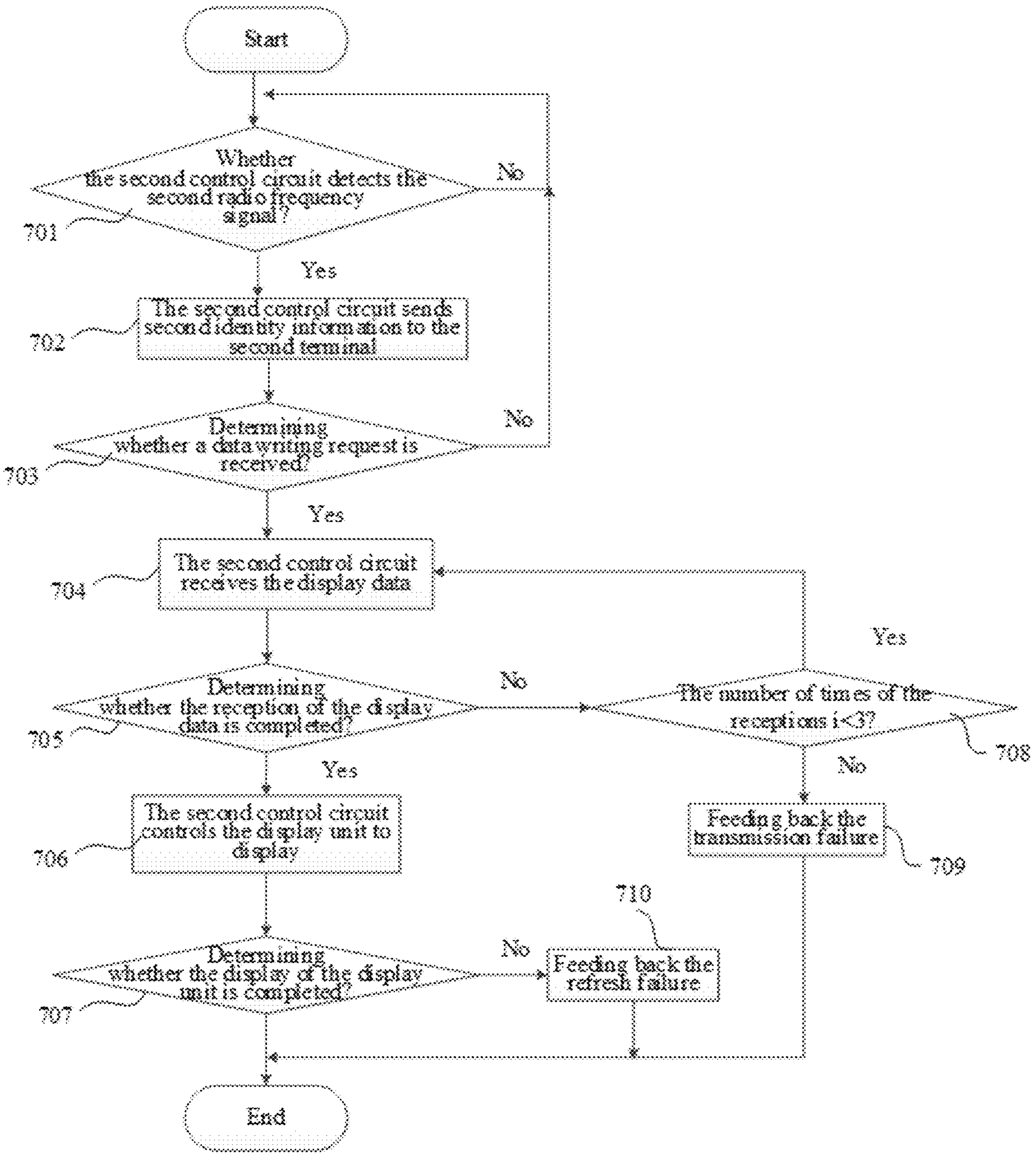
FIG. 7 schematically shows a schematic flow chart of a second control circuit for performing data transmission with a second terminal.

In practical applications, when the second control circuit 14 detects a second radio frequency signal, the second control circuit 14 performs protocol (such as an NFC protocol) instruction matching with the second terminal, and after the protocol instruction matching is completed, data transmission is performed between the second control circuit 14 and the second terminal. Referring to FIG. 7, it schematically shows a schematic flow chart of a second control circuit 14 for performing data transmission with a second terminal, and may specifically include:

step 701: whether the second control circuit detects the second radio frequency signal? If so, performing step 702, and if not, re-performing step 701.

step 702: the second control circuit sends second identity information to the second terminal.

step 703: the second control circuit determines whether a data writing request is received. If so, performing step 704, and if not, re-performing step 701.

step 704: the second control circuit receives the display data sent by the second terminal.

step 705: determining whether the reception of the display data is completed? If so, performing step 706, and if not, performing step 708.

step 706: the second control circuit controlling the display unit to display.

step 707: determining whether the display of the display unit is completed? If so, ending the process; and if not, performing step 710.

step 708: determining whether the number of times of receptions i<3 is established? If so, re-performing step 704; and if not, performing step 709. Wherein the preset number of times is 3.

step 709: feeding back the transmission failure.

step 710: feeding back the refresh failure.

Illustratively, when the second control circuit 14 includes a power supply control module 21, a storage capacitor 22 and a display control module 23, before the step of controlling the display unit 10 to display according to the display data in step S02, it may also include:

step S11: in a second state, the power supply control module 21 collecting the second electric energy generated by the induction coil 11 receiving the second radio frequency signal, and storing the second electric energy into the storage capacitor 22.

step S12: at a first moment, controlling the conduction between the storage capacitor 22 and the display control module 23, so that the display control module 23 controls the display unit 10 to display according to display data driven by the storage voltage; wherein the first moment is a moment delayed by a preset duration relative to the second moment, the preset duration is greater than or equal to 0s; the second moment is a moment when the storage voltage of the storage capacitor 22 is greater than or equal to the reference voltage, and the reference voltage is greater than or equal to the operating voltage of the display control module or the driving chip.

By disposing the voltage comparator 212, when the storage voltage is greater than or equal to the reference voltage, the conduction between the storage capacitor 22 and the display control module 23 is controlled, to ensure that the driving chip 32 can operate normally after conducting.

When the preset duration is greater than 0s, i.e. after the storage voltage is greater than or equal to the reference voltage, the preset duration is delayed so that the storage capacitor 22 stores more electric energy. By delaying the energy supply and ensuring the electric energy stored in the storage capacitor 22, display data transmission and picture update can be successfully completed, to improve the success rate of refresh display and avoid power interruption during the data transmission or refresh display.

Illustratively, the preset duration may be 20 μs, 10 μs, etc. and the present disclosure is not limited thereto.

Illustratively, the display unit 10 includes a plurality of pixel units, each of which includes a pixel electrode for providing an electric field for moving the dyed particles and at least two differently colored dyed particles.

Accordingly, the step of controlling the display unit 10 to display according to the display data in step S02 may include:

step S21: in an equilibration stage, providing a first pulse signal to the pixel electrode to make the dyed particles stationary.

Step S22: in a shaking up stage, providing a second pulse signal to the pixel electrode to disperse the dyed particles of different colors from each other.

Step S23: in a display stage, according to the display data, providing a third pulse signal to the pixel electrode to move the dyed particles under the action of the electric field for picture display.

Wherein a sum of the durations of the equilibration stage, the shaking up stage and the display stage is less than or equal to fifteen seconds.

Further, the total duration of the equilibration stage, the shaking up stage and the display stage may be less than or equal to ten seconds.

In the related art, an electronic ink screen display device (electronic paper) includes dyed particles with three colors of black, white and red, wherein the black particles are generally prepared by modifying carbon black and are positively charged; the white particles are prepared by modifying titanium dioxide, and the particles are negatively charged; the red particles are prepared by modifying compounds such as iron oxide and are positively charged. Since the black particles and the red particles have the same charge, it is difficult to display the two kinds of particles separately if the two kinds of particles have similar mass and charge, and when driven by the same voltage, the movement speed of the two kinds of particles is similar. In order to distinguish between the two colored dyed particles, the red particles may be designed to have a greater mass than the black particles. Under the same conditions, the black particles are light, so the relative movement speed is fast. At the same time, the driving voltage of black particles may be greater than the driving voltage of red particles during the driving design, and the movement speed of black particles may be further accelerated. In this way, the movement speed of red particles and black particles may be distinguished to achieve different color displays.

According to the chemical characteristics of each particle and the operability in practical applications, the driving voltage of black particles may be greater than or equal to 11V and less than or equal to 15V, the driving voltage of white particles may be greater than or equal to −15V and less than or equal to −11V, and the driving voltage of red particles may be greater than or equal to 4V and less than or equal to 7V. During the actual waveform driving, the equilibration stage, shaking up stage and display stage are further subdivided into the following eight stages:

stage1: equilibrating the black and white particles. Stage1 is mainly used to compensate the charge equilibration of black and white particles of the whole driving waveform, to make the black and white particles keep still after the picture is displayed in a static state, thereby ensuring the display stability of the black and white pictures;

stage2: equilibrating the red particles, and shaking up the black and white particles. Stage2 has two main purposes: firstly, compensating the charge equilibration of the red particles of the whole driving waveform, to make the red particles keep still after the picture is displayed in a static state, thereby ensuring the display stability of the red picture; secondly, dispersing the black and white particles simultaneously and moving them uniformly, to prepare for imaging the following particles;

stage3: shaking up the black, white and red particles slowly at a low frequency. Stage3 mainly separates, shakes up and disperses the white particles from the black and red particles in the pixel unit;

stage4: shaking up the black, white and red particles rapidly at a high frequency. Stage4 mainly separates, shakes up and disperses the black particles and red particles in the pixel unit;

stage5: refreshing and displaying a red picture;

stage6: refreshing and displaying black and white pictures;

stage7: refreshing and displaying the red picture again, and adjusting the red chroma;

stage8: refreshing and displaying the red picture all over again, and adjusting the red chroma.

Figure 8:
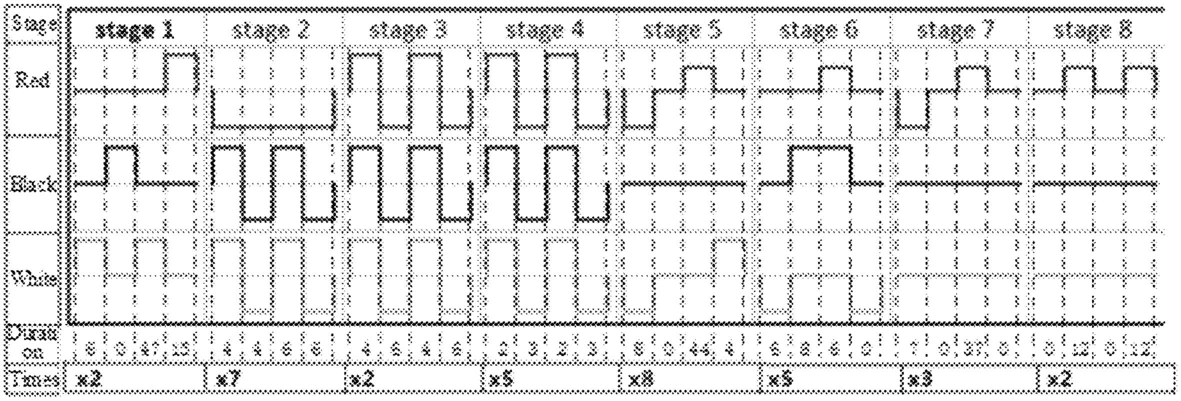
FIG. 8 schematically shows a schematic pulse waveform diagram for driving a display unit for refresh display.

Referring to FIG. 8, it respectively shows pulse waveform diagrams at various stages. Wherein stage1 and stage2 are equilibrium stages, stage3 and stage4 are shaking up stages, and stage5 to stage8 are display stages. In FIG. 8, the frame frequency of the display unit is 120 Hz, the frame duration is IT=1/120s, and the duration unit is T in FIG. 8. The number of times corresponding to each stage is the number of times of repetitions of the pulse waveform at this stage. As can be seen from the schematic pulse waveform diagram shown in FIG. 8, the total duration of stages is:

$$[(6+0+27+15)\times 2+(4+4+6+6)\times 7+(4+6+4+6)\times 2+(2+3+2+3)\times 5+(8+0+44+4)\times 8+(6+8+6)\times 5+(7+0+37)\times 3+(0+12+0+12)\times 2]\times 1/120=8.7833\text{ s}$$

By shortening the total duration of the refresh display process and increasing the waveform conversion frequency, the energy loss during the picture refresh may be reduced, the success rate of refresh display may be improved, and power interruption during the data transmission or refresh display may be avoided.

In the present disclosure, the meaning of "a plurality of" is two or more, and the meaning of "at least one" is one or more, unless otherwise specifically defined.

In the present disclosure, an orientation or positional relationship indicated by the terms "upper" and "lower" is based on orientation or positional relationships shown in the drawings, and are merely for convenience of describing the present disclosure and simplifying the description, rather than indicate or imply that the device or element referred to must have a specific orientation, be configured and operated in a specific orientation, and thus cannot be understood as a limitation on the present disclosure.

In the claims, any reference signs between parentheses should not be construed as limiting the claims.

Relational terms herein such as first and second, etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, method, article, or terminal device including a plurality of elements includes not only those elements but also includes other elements not expressly listed, or also incudes elements inherent to such a process, method, article, or device. In the absence of further limitation, an element defined by the phrase "including a . . . " does not exclude the presence of additional identical element in the process, method, article, or terminal device.

The driving circuit provided by the present application are described in detail above. Specific examples are applied to explain the principle and implementation of the present application herein. The above embodiments are only used to help understand the method of the present application and the core idea thereof.

The various embodiments in this specification are described in a progressive manner. Each embodiment focuses on the differences from the other embodiments, and the same or similar parts between the various embodiments may be referred to each other.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

The present disclosure is intended to cover any variations, uses, or adaptive changes of the present disclosure. These variations, uses, or adaptive changes follow the general principles of the present disclosure and include common general knowledge or conventional technical means in the technical field, which are not disclosed herein. The specification and the embodiments are considered as being exemplary only, with a true scope and spirit of the present disclosure being indicated by the following claims.

The invention claimed is:

1. A driving circuit, comprising: an induction coil, a power supply control module, a storage capacitor and a display control module;

wherein the induction coil is configured for receiving a first radio frequency signal or a second radio frequency signal to supply power to the driving circuit; the first radio frequency signal comprises permission information configured for instructing the driving circuit to obtain permission or to disable the permission; and the second radio frequency signal comprises display data;

the power supply control module is respectively connected to the storage capacitor and the display control module, and is configured for collecting second electric energy generated by the induction coil receiving the second radio frequency signal, storing the second electric energy into the storage capacitor, and controlling the storage capacitor to conduct with the display control module when a storage voltage of the storage capacitor meets a power supply condition; and the display control module is further connected to a display unit, and is configured for controlling the display unit to display according to the display data driven by the storage voltage;

wherein the display control module comprises a second transistor, a current limiting resistor, a boost circuit and a driving chip;

wherein a control electrode of the second transistor is connected to the driving chip, a first electrode of the second transistor is connected to the boost circuit, and a second electrode of the second transistor is respectively connected to a first end of the current limiting resistor and the driving chip; the boost circuit is further connected to the power supply control module, a first interface of the driving chip and a second interface of the driving chip, and is configured for performing voltage writing on the first interface and the second interface according to an output of the first electrode of the second transistor driven by the storage voltage; a second end of the current limiting resistor is connected to ground; and the driving chip is further connected to the display unit, and is configured for providing a pulse signal to the display unit according to the display data, a voltage of the first interface and a voltage of the second interface.

2. The driving circuit according to claim 1, further comprising a first switch module, a first control circuit and a second control circuit;

wherein the first switch module is respectively connected to the induction coil, the first control circuit and the second control circuit, and is configured for conducting the induction coil and the first control circuit in a first state or conducting the induction coil and the second control circuit in a second state;

the first control circuit is configured for performing data transmission with a first terminal in the first state; and the first terminal is a terminal for transmitting the first radio frequency signal; and the second control circuit is further connected to the display unit, and is configured for receiving display data sent by a second terminal in the second state, and controlling the display unit to display according to the display data; and the second terminal is a terminal for transmitting the second radio frequency signal.

3. The driving circuit according to claim 2, wherein the first switch module comprises at least one of: a magnetic reed switch, a tact switch and a toggle switch.

4. The driving circuit according to claim 3, wherein the first control circuit comprises a passive electronic tag.

5. The driving circuit according to claim 2, wherein the second control circuit comprises: the power supply control module, the storage capacitor and the display control module;

wherein the power supply control module is respectively connected to the first switch module, the storage capacitor and the display control module, and is configured for collecting the second electric energy generated by the induction coil receiving the second radio frequency signal, storing the second electric energy into the storage capacitor, and controlling the storage capacitor to conduct with the display control module when a storage voltage of the storage capacitor meets a power supply condition.

6. The driving circuit according to claim 5, wherein the power supply control module comprises a processing unit, a voltage comparator and a second switch module;

wherein the processing unit is respectively connected to the first switch module, the storage capacitor, the voltage comparator and the second switch module, and is configured for collecting the second electric energy, storing the second electric energy into the storage capacitor; generating a control signal of the second switch module according to a comparison result output by the voltage comparator;

the voltage comparator is further connected to the storage capacitor and a reference voltage input end, and is configured for comparing the storage voltage with a reference voltage input by the reference voltage input end and outputting a comparison result to the processing unit; and the second switch module is further connected to the storage capacitor and the display control module, and is configured for controlling the conduction/shutoff between the storage capacitor and the display control module according to the control signal.

7. The driving circuit according to claim 6, wherein the second switch module comprises:

a first transistor, a control electrode of the first transistor being connected to the processing unit, a first electrode of the first transistor being connected to the storage capacitor and a second electrode of the first transistor being connected to the display control module.

8. The driving circuit according to claim 7, wherein the first control circuit comprises a passive electronic tag.

9. The driving circuit according to claim 6, wherein the first control circuit comprises a passive electronic tag.

10. The driving circuit according to claim 5, wherein the first control circuit comprises a passive electronic tag.

11. The driving circuit according to claim 2, wherein the first control circuit comprises a passive electronic tag.

12. A display device, comprising the driving circuit according to claim 1 and the display unit.

13. The display device according to claim 12, wherein the display unit comprises an electronic paper.

14. A driving method applied to the driving circuit, wherein the driving circuit includes an induction coil, a power supply control module, a storage capacitor and a display control module;

wherein the induction coil is configured for receiving a first radio frequency signal or a second radio frequency signal to supply power to the driving circuit; the first radio frequency signal comprises permission information configured for instructing the driving circuit to obtain permission or to disable the permission; and the second radio frequency signal comprises display data;

the power supply control module is respectively connected to the storage capacitor and the display control module, and is configured for collecting second electric energy generated by the induction coil receiving the second radio frequency signal, storing the second electric energy into the storage capacitor, and controlling the storage capacitor to conduct with the display control module when a storage voltage of the storage capacitor meets a power supply condition; and the display control module is further connected to a display unit, and is configured for controlling the display unit to display according to the display data driven by the storage voltage; and the driving circuit further includes a first switch module, a first control circuit and a second control circuit;

wherein the first switch module is respectively connected to the induction coil, the first control circuit and the second control circuit, and is configured for conducting the induction coil and the first control circuit in a first state or conducting the induction coil and the second control circuit in a second state;

the first control circuit is configured for performing data transmission with a first terminal in the first state; and the first terminal is a terminal for transmitting the first radio frequency signal; and the second control circuit is further connected to the display unit, and is configured for receiving display data sent by a second terminal in the second state, and controlling the display unit to display according to the display data; and the second terminal is a terminal for transmitting the second radio frequency signal; and the driving method comprising:

in the first state, the induction coil receiving the first radio frequency signal, and the first control circuit performing the data transmission with the first terminal; and in the second state, the induction coil receiving the second radio frequency signal, the second control circuit receiving the display data sent by the second terminal, and controlling the display unit to display according to the display data.

15. The driving method according to claim 14, wherein the step of performing data transmission with the first terminal comprises:

sending first identity information to the first terminal, and receiving the permission information fed back by the first terminal; wherein the permission information is generated by the first terminal according to the first identity information, and is configured for instructing the driving circuit to obtain the permission or to disable the permission.

16. The driving method according to claim 14, wherein the step of receiving display data sent by the second terminal comprises:

sending second identity information to the second terminal, so that the second terminal determines whether to send a data writing request according to the second identity information; and receiving the display data in response to the data writing request.

17. The driving method according to claim 14, wherein the step of controlling the display unit to display according to the display data comprises:

controlling the display unit to display according to the display data, when reception of the display data is completed;

after the step of receiving the display data sent by the second terminal, before the step of controlling the display unit to display according to the display data, further comprising:

when the reception of the display data is interrupted, and a number of times of reception is less than the preset number of times, re-performing the step of receiving the display data sent by the second terminal;

when the reception of the display data is interrupted, and the number of times of reception is greater than or equal to the preset number of times, feeding back information about data transmission failure.

18. The driving method according to claim 14, wherein when the second control circuit comprises the power supply control module, the storage capacitor and the display control module, before the step of controlling the display unit to display according to the display data, further comprising:

in the second state, the power supply control module collecting the second electric energy generated by the induction coil receiving the second radio frequency signal, and storing the second electric energy into the storage capacitor;

at a first moment, controlling conduction between the storage capacitor and the display control module, so that the display control module controls the display unit to display according to the display data driven by the storage voltage; wherein the first moment is a moment delayed by a preset duration relative to a second moment, the preset duration is greater than or equal to zero seconds, the second moment is a moment when the storage voltage of the storage capacitor is greater than or equal to a reference voltage, and the reference voltage is greater than or equal to an operating voltage of the display control module.

19. The driving method according to claim 14, wherein the display unit comprises a plurality of pixel units, the pixel units comprise pixel electrodes and at least two differently colored dyed particles, the pixel electrodes are configured for providing an electric field for moving the dyed particles; and the step of controlling the display unit to display according to the display data comprises:

in an equilibration stage, providing a first pulse signal to the pixel electrodes to make the dyed particles stationary;

in a shaking up stage, providing a second pulse signal to the pixel electrodes to disperse the dyed particles of different colors from each other;

in a display stage, according to the display data, providing a third pulse signal to the pixel electrodes to move the dyed particles under the action of the electric field for picture display;

wherein a sum of durations of the equilibration stage, the shaking up stage and the display stage is less than or equal to fifteen seconds.

* * * * *